US008892117B2

(12) United States Patent
Obradovich (10) Patent No.: US 8,892,117 B2
(45) Date of Patent: Nov. 18, 2014

(54) GPS PUBLICATION APPLICATION SERVER (75) Inventor: Michael L. Obradovich, San Clemente, CA (US)

(73) Assignee: Silver State Intellectual Technologies, Inc., Las Vegas, NV (US)

(*) Notice: Subject to any disclaimer, the term of this patent is extended or adjusted under 35 U.S.C. 154(b) by 1045 days.

(21) Appl. No.: 12/075,403

(22) Filed: Mar. 10, 2008

(65) Prior Publication Data

US 2008/0248810 A1    Oct. 9, 2008

Related U.S. Application Data (63) Continuation of application No. 09/833,969, filed on Apr. 11, 2001, now Pat. No. 7,343,165.

(60) Provisional application No. 60/196,575, filed on Apr. 11, 2000.

(51) Int. Cl.
*H04W 24/00* (2009.01)
*H04W 4/02* (2009.01)
*H04M 3/42* (2006.01)
*H04W 8/08* (2009.01)
*H04W 8/14* (2009.01)
*H04W 8/18* (2009.01)
*H04W 8/20* (2009.01)

(52) U.S. Cl.
CPC . *H04W 4/02* (2013.01); *H04W 8/08* (2013.01); *H04W 8/14* (2013.01); *H04W 8/18* (2013.01); *H04W 8/20* (2013.01)
USPC ........................................ 455/456.1; 455/461

(58) Field of Classification Search
USPC ............................ 455/456.1–456.6, 457, 461; 342/357.01, 357.09
See application file for complete search history.

(56) References Cited

U.S. PATENT DOCUMENTS

| 4,350,970 A | 9/1982 | von Tomkewitsch |
| 4,521,857 A | 6/1985 | Reynolds, III |
| 4,792,803 A | 12/1988 | Madnick et al. |
| 4,812,843 A | 3/1989 | Champion, III et al. |
| 4,977,509 A | 12/1990 | Pitchford et al. |
| 5,043,736 A | 8/1991 | Darnell et al. |

(Continued)

FOREIGN PATENT DOCUMENTS

| EP | 0713317 | 5/1996 |
| EP | 0829704 A2 | 3/1998 |

(Continued)

OTHER PUBLICATIONS

International Search Report of PCT/US01/12066 mailed Aug. 8, 2001 (4 pages).

(Continued)

*Primary Examiner* — Lee Nguyen
(74) *Attorney, Agent, or Firm* — Klein, O'Neill & Singh, LLP (57) ABSTRACT

A GPS publicaton application server. A mobile location knowledgeable device is in communication with a server. The server provides indications of the device's location to a home page associated with the device. The home page includes information about a user of the device and methods of contacting the user at any particular time. The server is also in communication with a variety of application servers. The application servers push information to the device depending on the device location and preferences listed in the home page of the device.

22 Claims, 6 Drawing Sheets

(56) References Cited

U.S. PATENT DOCUMENTS

| | | | |
|---|---|---|---|
| 5,119,504 | A | 6/1992 | Durboraw, III |
| 5,124,915 | A | 6/1992 | Krenzel |
| 5,164,904 | A | 11/1992 | Sumner |
| 5,189,632 | A | 2/1993 | Paajanen et al. |
| 5,225,843 | A | 7/1993 | Thompson |
| 5,235,633 | A | 8/1993 | Dennison et al. |
| 5,265,024 | A | 11/1993 | Crabill et al. |
| 5,267,042 | A | 11/1993 | Tsuchiya et al. |
| 5,295,064 | A | 3/1994 | Malec et al. |
| 5,299,132 | A | 3/1994 | Wortham |
| 5,334,974 | A | 8/1994 | Simms et al. |
| 5,335,276 | A | 8/1994 | Thompson et al. |
| 5,420,592 | A | 5/1995 | Johnson |
| 5,432,841 | A | 7/1995 | Rimer |
| 5,450,329 | A | 9/1995 | Tanner |
| 5,479,351 | A | 12/1995 | Woo et al. |
| 5,479,482 | A | 12/1995 | Grimes |
| 5,497,339 | A | 3/1996 | Bernard |
| 5,517,193 | A | 5/1996 | Allison et al. |
| 5,519,403 | A | 5/1996 | Bickley et al. |
| 5,528,248 | A | 6/1996 | Steiner |
| 5,555,286 | A | 9/1996 | Tendler |
| 5,559,520 | A | 9/1996 | Barzegar et al. |
| 5,559,707 | A | 9/1996 | DeLorme et al. |
| 5,572,204 | A | 11/1996 | Timm et al. |
| 5,579,535 | A | 11/1996 | Orlen et al. |
| 5,625,668 | A | 4/1997 | Loomis et al. |
| 5,625,884 | A | 4/1997 | Gitlin et al. |
| 5,627,549 | A | 5/1997 | Park |
| 5,630,068 | A | 5/1997 | Vela et al. |
| 5,636,269 | A | 6/1997 | Eisdorfer |
| 5,642,285 | A | 6/1997 | Woo et al. |
| 5,647,002 | A | 7/1997 | Brunson |
| 5,648,763 | A | 7/1997 | Long |
| 5,648,769 | A | 7/1997 | Sato et al. |
| 5,654,886 | A | 8/1997 | Zereski, Jr. et al. |
| 5,661,652 | A | 8/1997 | Sprague et al. |
| 5,663,548 | A | 9/1997 | Hayashi et al. |
| 5,673,039 | A | 9/1997 | Pietzsch et al. |
| 5,677,837 | A | 10/1997 | Reynolds |
| 5,680,444 | A | 10/1997 | Reeves |
| 5,694,514 | A | 12/1997 | Evans et al. |
| 5,699,056 | A | 12/1997 | Yoshida |
| 5,712,625 | A | 1/1998 | Murphy |
| 5,717,748 | A | 2/1998 | Sneed, Jr. et al. |
| 5,717,749 | A | 2/1998 | Sneed, Jr. et al. |
| 5,719,936 | A | 2/1998 | Hillenmayer |
| 5,720,037 | A | 2/1998 | Biliris et al. |
| 5,724,417 | A | 3/1998 | Bartholomew et al. |
| 5,727,053 | A | 3/1998 | Sizer, II et al. |
| 5,727,156 | A * | 3/1998 | Herr-Hoyman et al. ...... 709/219 |
| 5,731,997 | A | 3/1998 | Manson et al. |
| 5,742,509 | A | 4/1998 | Goldberg et al. |
| 5,748,252 | A | 5/1998 | Draves |
| 5,760,742 | A | 6/1998 | Branch et al. |
| 5,774,070 | A | 6/1998 | Rendon |
| 5,774,825 | A | 6/1998 | Reynolds |
| 5,774,827 | A | 6/1998 | Smith, Jr. et al. |
| 5,781,150 | A | 7/1998 | Norris |
| 5,786,789 | A | 7/1998 | Janky |
| 5,790,974 | A | 8/1998 | Tognazzini |
| 5,794,174 | A | 8/1998 | Janky et al. |
| 5,802,492 | A | 9/1998 | DeLorme et al. |
| 5,819,227 | A | 10/1998 | Obuchi |
| 5,835,907 | A | 11/1998 | Newman |
| 5,848,373 | A | 12/1998 | DeLorme et al. |
| 5,864,305 | A | 1/1999 | Rosenquist |
| 5,908,464 | A | 6/1999 | Kishigami et al. |
| 5,918,159 | A | 6/1999 | Fomukong et al. |
| 5,919,246 | A | 7/1999 | Waizmann et al. |
| 5,929,774 | A | 7/1999 | Charlton |
| 5,938,721 | A | 8/1999 | Dussell et al. |
| 5,946,626 | A | 8/1999 | Foladare et al. |
| 5,948,040 | A | 9/1999 | DeLorme et al. |
| 5,963,956 | A | 10/1999 | Smartt |
| 5,982,298 | A | 11/1999 | Lappenbusch et al. |
| 5,999,124 | A | 12/1999 | Sheynblat |
| 5,999,877 | A | 12/1999 | Takahashi et al. |
| 6,028,550 | A | 2/2000 | Froeberg et al. |
| 6,047,327 | A | 4/2000 | Tso et al. |
| 6,075,874 | A | 6/2000 | Higashikubo et al. |
| 6,087,965 | A | 7/2000 | Murphy |
| 6,092,076 | A | 7/2000 | McDonough et al. |
| 6,107,939 | A | 8/2000 | Sorden |
| 6,107,944 | A | 8/2000 | Behr et al. |
| 6,119,066 | A | 9/2000 | Sugiura et al. |
| 6,122,506 | A | 9/2000 | Lau et al. |
| 6,124,825 | A | 9/2000 | Eschenbach |
| 6,127,945 | A | 10/2000 | Mura-Smith |
| 6,131,066 | A | 10/2000 | Ahrens et al. |
| 6,134,501 | A | 10/2000 | Oumi |
| 6,141,610 | A | 10/2000 | Rothert et al. |
| 6,144,920 | A | 11/2000 | Mikame |
| 6,147,598 | A | 11/2000 | Murphy et al. |
| 6,148,261 | A | 11/2000 | Obradovich et al. |
| 6,163,749 | A | 12/2000 | McDonough et al. |
| 6,163,753 | A | 12/2000 | Beckmann et al. |
| 6,166,626 | A | 12/2000 | Janky et al. |
| 6,169,955 | B1 | 1/2001 | Fultz |
| 6,173,231 | B1 | 1/2001 | Chojnacki |
| 6,184,801 | B1 | 2/2001 | Janky |
| 6,185,427 | B1 | 2/2001 | Krasner et al. |
| 6,188,957 | B1 | 2/2001 | Bechtolsheim et al. |
| 6,192,312 | B1 | 2/2001 | Hummelsheim |
| 6,192,314 | B1 | 2/2001 | Khavakh et al. |
| 6,199,013 | B1 | 3/2001 | O'Shea |
| 6,202,023 | B1 | 3/2001 | Hancock et al. |
| 6,208,934 | B1 | 3/2001 | Bechtolsheim et al. |
| 6,212,392 | B1 | 4/2001 | Fitch et al. |
| 6,212,470 | B1 | 4/2001 | Seymour et al. |
| 6,212,472 | B1 | 4/2001 | Nonaka et al. |
| 6,212,473 | B1 | 4/2001 | Stefan et al. |
| 6,212,550 | B1 | 4/2001 | Segur |
| 6,215,857 | B1 | 4/2001 | Kasiviswanathan |
| 6,215,993 | B1 | 4/2001 | Ulveland |
| 6,219,557 | B1 | 4/2001 | Havinis |
| 6,219,614 | B1 | 4/2001 | Uchihaki et al. |
| 6,219,694 | B1 | 4/2001 | Lazaridis et al. |
| 6,321,158 | B1 | 11/2001 | DeLorme et al. |
| 6,332,127 | B1 | 12/2001 | Bandera et al. |
| 6,360,102 | B1 | 3/2002 | Havinis et al. |
| 6,377,210 | B1 | 4/2002 | Moore |
| 6,377,793 | B1 | 4/2002 | Jenkins |
| 6,377,810 | B1 | 4/2002 | Geiger et al. |
| 6,400,941 | B1 | 6/2002 | Nara |
| 6,442,479 | B1 | 8/2002 | Barton |
| 6,510,350 | B1 | 1/2003 | Steen, III et al. |
| 6,519,463 | B2 | 2/2003 | Tendler |
| 6,549,768 | B1 | 4/2003 | Fraccaroli |
| 6,587,691 | B1 | 7/2003 | Granstam et al. |
| 6,677,894 | B2 * | 1/2004 | Sheynblat et al. ....... 342/357.46 |
| 6,838,998 | B1 | 1/2005 | Brown et al. |
| 6,947,976 | B1 | 9/2005 | Devitt et al. |
| 6,968,179 | B1 | 11/2005 | De Vries |
| 7,130,630 | B1 | 10/2006 | Enzmann et al. |
| 7,343,165 | B2 | 3/2008 | Obradovich |
| 2002/0068551 | A1 | 6/2002 | Strunk et al. |
| 2010/0113069 | A1 * | 5/2010 | Mindrum et al. .......... 455/456.3 |

FOREIGN PATENT DOCUMENTS

| | | |
|---|---|---|
| EP | 0853287 A2 | 7/1998 |
| EP | 1133827 | 12/2006 |
| JP | 9-231263 | 9/1997 |
| JP | 113072 | 1/1999 |
| JP | 11-055726 | 2/1999 |
| JP | 11-191127 | 7/1999 |
| JP | 2000-275319 | 10/2000 |
| JP | 2000-322446 | 11/2000 |
| WO | WO 98-52379 | 11/1998 |
| WO | WO 99-23591 | 5/1999 |
| WO | WO 99-56144 | 11/1999 |

(56) References Cited

FOREIGN PATENT DOCUMENTS

| WO | WO 00/03364 | 1/2000 |
|----|----|----|
| WO | WO 00/04730 | 1/2000 |
| WO | WO 00-22860 | 4/2000 |

OTHER PUBLICATIONS

Written Opinion for International Application PCT/US01/12066, filed Apr. 11, 2001, mailed Apr. 10, 2002 (4 pages).
Supplementary European Search Report for European Application Publication No. 1279305, published Jan. 29, 2003, Search Report Dated Mar. 21, 2008 (3 pages).
Martin Wolk, "Microsoft unveils plans for car dashboard computer," Reuters Article, Copyright date 1998 (2 pages).
Alcatel web pages, Alcatel, Nov. 24, 1998 (58 pages).
Giga Information Group, Inc. web pages, Giga Information Group, Inc. Nov. 24, 1998 (4 pages).
Spyglass web pages, Spyglass, Nov. 24, 1998 (58 pages).
Think Thin, PC Magazine, Dec. 1, 1998 (p. 9).
McDonald, Keith D., "Course 122—GPS Fundamentals & Applications", Navtech Seminars & GPS Supply, Inc., Catamaran Resort Hotel, San Diego, CA, Mar. 22-23, 1999 (336 sheets).
Kelley, Tom, "Traffic Control Traffic Data, Unplugged", ITS World, Jul./Aug. 2000 (pp. 28-30).
Bishop, Richard, "The Final Stop Remember IVHS?", ITS World, Jul./Aug. 2000 (pp. 14-15).
Metricom in the News, web pages, Metricom, Inc., Nov. 24, 1998 (8 pages).
Demmler, "Another car navigation system," Automotive Engineering, Jun. 1996, pp. 87, 89 (2 pages).
Jewett, "Toyota offers navigation system as U.S. option," Automotive News, Nov. 18, 1996, p. 16 (2 pages).
Yamaguchi, "Honda in-car navigation system for the U.S.," Automotive Engineering, Jun. 1996, pp. 82-84 (3 pages).
Heuchert, "Eyes Forward: An ergonomic solution to driver information overload," Automotive Engineering, Sep. 1996, pp. 27-31 (5 pages).
Noriyuki, "Just Think of It as a Big Eye in the Sky . . . Watching," Los Angeles Times, Section E, pp. 1, 8, Apr. 27, 1997 (3 pages).
"Trimble Demonstrates Trimconnect," Flying, Jul. 1997, p. 51 (1 page).
Steve Dye with Dr. Frank Baylin, The GPS Manual Principles and Applications, "Land Navigation Markets—Overview", Feb. 1997, ISBN:0-917893-29-8 (23 pages).
Strunk et al. U.S. Appl. No. 60/169,605, filed Dec. 8, 1999, entitled "System for Storing and Supplying Wireless Contacts Information," including Application Cover Sheet (1 page), Statements Claiming Small Entity Status (2 pages), Title Page (1 page), Specification (5 pages), Drawings (1 page) (10 pages total).
Notice of Filing Date Accorded to Petition and Time for Filing Patent Owner Preliminary Response, Case IPR2014-00159, dated Dec. 4, 2013.
Order Construing Terms of Claims, Case 2:12-cv-01308-GMN-PAL, Document 75, Filed Nov. 18, 2013.
Original Complaint for Patent Infringement, Case 2:12-cv-01308-RCJ-PAL, Document 1, Filed Jul. 25, 2012.
Plaintiff's Opening Claim Construction Brief, Case 2:12-cv-01308-GMN-PAL Document 52, Filed Aug. 23, 2013.
Plaintiff's Reply Claim Construction Brief, Case 2:12-cv-01308-GMN-PAL Document 59, Filed Sep. 13, 2013.
Locatio—Beginner's Guide.
Petition for Inter Partes Review of U.S. Patent No. 7,343,165 "GPS Publication Application Server," *Foursquare Labs, Inc.* v. *Silver State Intellectual Technologies, Inc.*
Office Action on U.S. Appl. No. 09/833,969 dated May 28, 2004.
Office Action on U.S. Appl. No. 09/833,969 dated Dec. 9, 2004.
Amendment on U.S. Appl. No. 09/833,969 dated Mar. 31, 2006.
Office Action on U.S. Appl. No. 09/833,969 dated Jul. 5, 2006.
Amendment on U.S. Appl. No. 09/833,969 dated Jul. 16, 2007.
Notice of Allowability on U.S. Appl. No. 09/833,969 dated Oct. 16, 2007.
Abowd, G.D. et al., Cyberguide: A mobile context-aware tour guide, Wireless Networks 3 (1997) pp. 421-433.
*Silver State Intellectual Technologies, Inc.* v. *TomTom, Inc.* (Case No. 2:11-cv-1581-PMP-PAL): Plaintiff's Response to Defendants' Contentions Pursuant to Local Rule of Patent Practice LR 16.1-10, dated Jun. 22, 2012.
*Silver State Intellectual Technologies, Inc.* v. *TomTom, Inc.* (Case No. 2:11-cv-01581 (PMP-PAL)): TomTom, Inc.'s First Supplemental Non-Infringement, Invalidity, and Unenforceability Contentions, with Appendices 1, A3, A9, B, C3, and C9, dated Jun. 4, 2012.
*Silver State Intellectual Technologies, Inc.* v. *TomTom, Inc.* (Case No. 2:11-cv-01581 (PMP-PAL)): TomTom, Inc.'s Preliminary Non-Infringement, Invalidity, and Unenforceability Contentions, dated May 9, 2012.
*Silver State Intellectual Technologies, Inc.* v. *Garmin International, Inc.* (Case No. 2:11-cv-01578-PMP-RJJ) and TomTom, Inc. (Case No. 2:11-cv-01581-PMP-PAL): Joint Claim Construction and Prehearing Statement Pursuant to LR 16.1-15, dated Sep. 7, 2012.
*Silver State Intellectual Technologies, Inc.* v. *Garmin International, Inc.* (Case No. 2:11-cv-1578-RCJ-RJJ): Plaintiff's Response to Defendants' Contentions Pursuant to Local Rule of Patent Practice LR 16.1-10, dated Jun. 29, 2012.
*Silver State Intellectual Technologies, Inc.* v. *Garmin International, Inc.* (Case No. 2:11-cv-1578-ECR-RJJ) Garmin's Preliminary Non-Infringement, Invalidity, and Unenforceability Contentions Under LR 16.1-8 and LR 16.1-9, dated May 16, 2012, with Appendices A4, B, and C4.
*Silver State Intellectual Technologies, Inc.* v. *Foursquare Labs, Inc.* (Case No. 2:12-cv-01308-GMN-PAL): Foursquare's Claim Construction Brief, dated Sep. 6, 2013.
*Silver State Intellectual Technologies, Inc.* v. *Foursquare Labs, Inc.* (Case No. 2:12-cv-01308-GMN-PAL): Plaintiff's Response to Defendants' Contentions Pursuant to Local Rule of Patent Practice LR 16.1-10, dated Jun. 14, 2013.
*Silver State Intellectual Technologies, Inc.* v. *Foursquare Labs, Inc.* (Case No. 2:12-cv-01308-GMN-PAL): Foursquare Lab's Initial Disclosure of Non-Infringement, Invalidity, and Unenforceability Pursuant to L.R. 16.1-8, dated Mar. 17, 2013.
Decision on Institution of Inter Partes Review, IPR2014-00159 (Patent No. 7,343,165 B2), Paper 6, May 28, 2014.
*Foursquare Labs, Inc.* v. *Silver State Intellectual Technologies, Inc.* (Case No. IPR2014-00159) Patent No. 7,343,165 B2: Patent Owner's Preliminary Response Pursuant to 37 C.F.R. §42.107, dated Mar. 4, 2014.
*Foursquare Labs, Inc.* v. *Silver State Intellectual Technologies, Inc.* (Case No. 2:12-cv-01308-GMN-PAL): Transcript of Markman Hearing, dated Oct. 28, 2013.
*Foursquare Labs, Inc.* v. *Silver State Intellectual Technologies, Inc.* (Case No. 2:12-cv-01308-GMN-PAL): Petitioner Foursquare Labs, Inc.'s Request for Rehearing Under 37 C.F.R. §42.71(d), dated Jun. 11, 2014.
*Foursquare Labs, Inc.* v. *Silver State Intellectual Technologies, Inc.* (Case No. 2:12-cv-01308-GMN-PAL): Decision Request for Rehearing 37 C.F.R. §42.71, dated Aug. 1, 2014.
*Foursquare Labs, Inc.* v. *Silver State Intellectual Technologies, Inc.* (Case No. 2:12-cv-01308-GMN-PAL): Patent Owner's Response Pursuant to 37 C.F.R. §42.120, dated Aug. 28, 2014.

\* cited by examiner

GPS PUBLICATION APPLICATION SERVER

CROSS-REFERENCE TO RELATED APPLICATIONS

The present application is a continuation of U.S. application Ser. No. 09/833,969 filed on Apr. 11, 2001, now U.S. Pat. No. 7,343,165 and claims the benefit of the filing date of U.S. Provisional Patent Application No. 60/196,575, filed Apr. 11, 2000, the disclosures of which are incorporated by reference.

BACKGROUND

The present invention relates generally to user mobile information systems, and more specifically to location identifiable user mobile communication systems.

The use of mobile communication units, such as cellular telephones, is becoming increasingly common. Cellular telephones, for example, allow individuals to communicate with others when those individuals are away from a base of operations, on the go, or at locations having insufficient or inconvenient land telephone lines. In addition, communication systems such as cellular telephones provide a simple and easy way to communicate with individuals carrying cellular telephones no matter where they are, so long as one knows the appropriate telephone number.

At times, however, knowledge of the location of an individual is important. For example, some communication methods, such as facsimile, generally are not mobile in nature. For example, often to send a facsimile one needs to know the location and number of a fixed fax machine to which a fax may be sent. Similarly, it is often difficult to courier packages to a person whose location is not known.

However, in many instances it is not feasible to contact an individual, even one who has a cellular telephone, and ask the individual their location. The individual may not know their location or other particular details such as street address or facsimile number necessary to send the individual items. Moreover, some individuals may jealously guard the number of their cellular telephone, so that in many instances it is not possible to simply call a person on their cellular telephone to determine their location. Further, in some instances people are unable to answer their cellular telephone to provide their location information to those who know their telephone number.

Thus, the use of cellular telephones and generally mobile communication systems, provides for the increased transmission of information between individuals, particularly those on the move. However, the communication of information, particularly other than a voice information, is not fully utilized using such communication systems.

In addition, individuals on the move often have unique information requirements, particularly with respect to information concerning places near their location. Such needs are also not fully met by mobile communication systems, even though such information is generally available on communication networks. For example, server computers reachable through the internet are commonly provide nearly boundless information, with much of the information having geographical relevance. Such information is often largely unavailable to users of mobile communication systems, and moreover is not particularly adapted to suit the needs of users of mobile communication systems.

SUMMARY OF THE INVENTION

In one embodiment of the present invention a GPS server periodically requests information from a mobile device. The mobile device includes GPS receiver circuitry to receive GPS signals. The GPS receiver makes use of information provided by a GPS reference server and error correction processing performed by the GPS reference server to determine its location. Upon probing by the GPS server the mobile device provides the GPS server the present position of the mobile device, as well as additional information.

Techniques for communicating GPS related information to wireless devices, particularly information allowing a wireless communication device to quickly obtain its location are known. In the present invention, certain user preferences are communicated to Internet coupled computer devices.

In this new system and method certain preferences are sent from a wireless device to a GPS server and then forwarded on to a separate application server for storing in the users personal home page location, or user-specific storage space allows the user to populate their own database and communicate certain information from that database to other users that were enabled to receive the populated information.

Work groups, community groups and other would be a recipient of this populated database system, thereby allowing dynamic data exchange between preidentified parties. Moreover, different users may have different specific applications that take advantage of this population technique.

Examples include advertising information provided to a user's device once the user's travel pattern is established and personal preferences are considered. Call ID system could be updated and other users would be able to communicate with the user upon receipt of their requests. Using this system the user may simply send visited locations as determined by the GPS server to the users home page for storage and for populating a user's database. Acting on timely requests the GPS server modifies the user's preferences upon probing the user for the GPS data and contact information.

At any time the user could contact the home page for review of stored information and to modify the status of users who subscribe to the user's home page.

This new publishing and subscribing system puts increases storage and calculation tasks on an application server to sort out and serve up to the user upon a request. The PCD device uses less battery power and is not required to perform task beyond its normal operations and changing the user's preferences for the publishing system. The user may request a complete review of their dynamic data upon contacting their own home page. Caller ID systems thereafter route the request for contact to the user's home page and then be given choices for going forward. The user can deny any party access upon sending data along with the GPS probe made by the GPS server. This system does not require the user to make further contact when changing their preferences.

DETAILED DESCRIPTION

Figure 1:
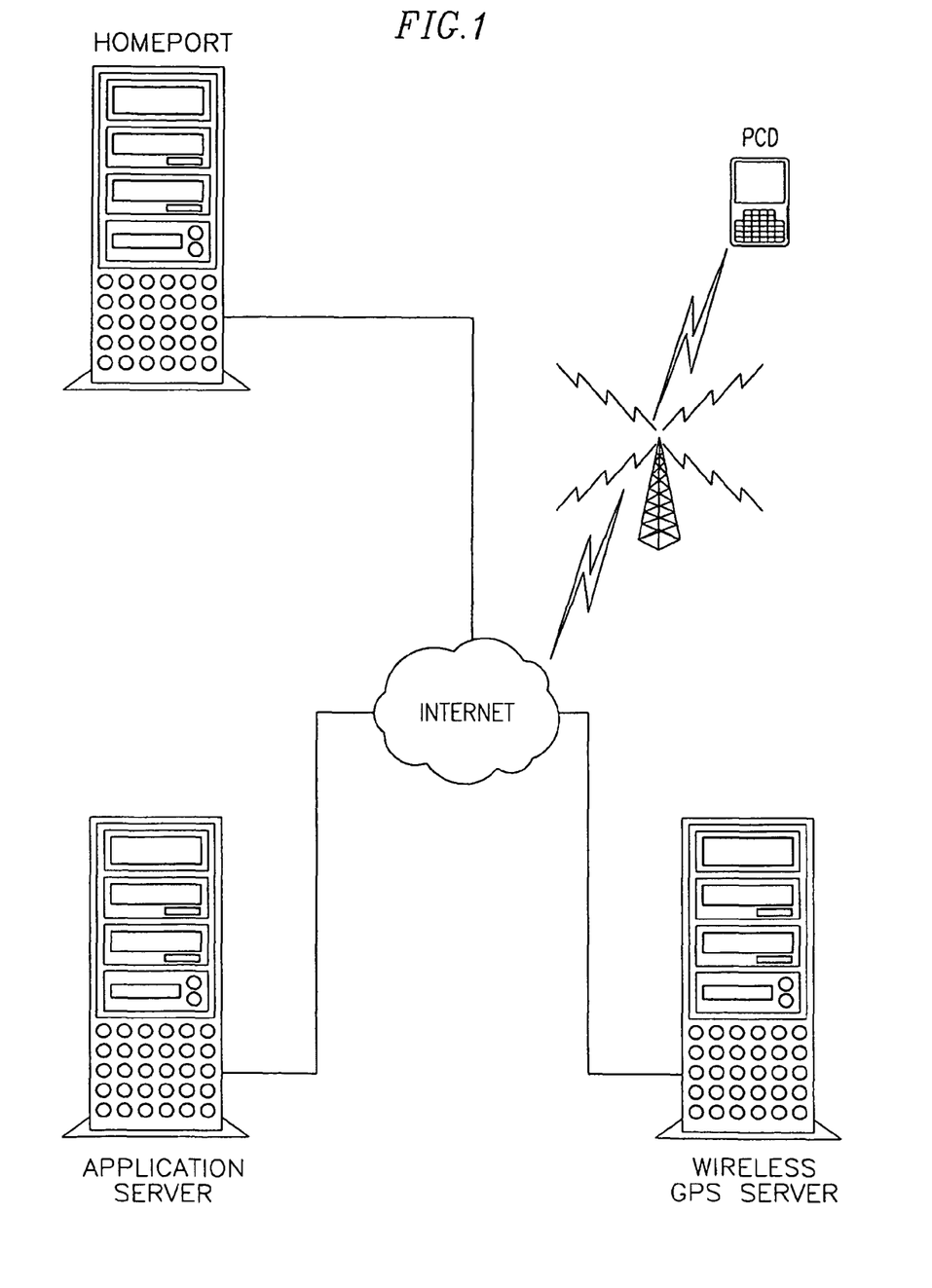
FIG. 1 is a further block diagram of a system in accordance with aspects of the present invention.
Figure 1A:
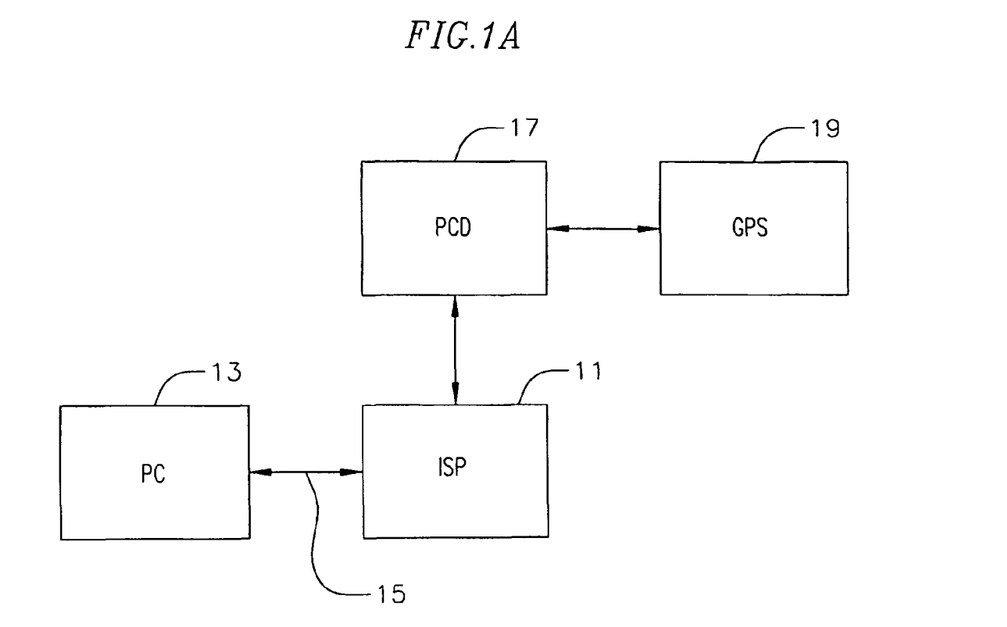
FIG. 1A is a block diagram of a system in accordance with aspects of the present invention.
Figure 5:
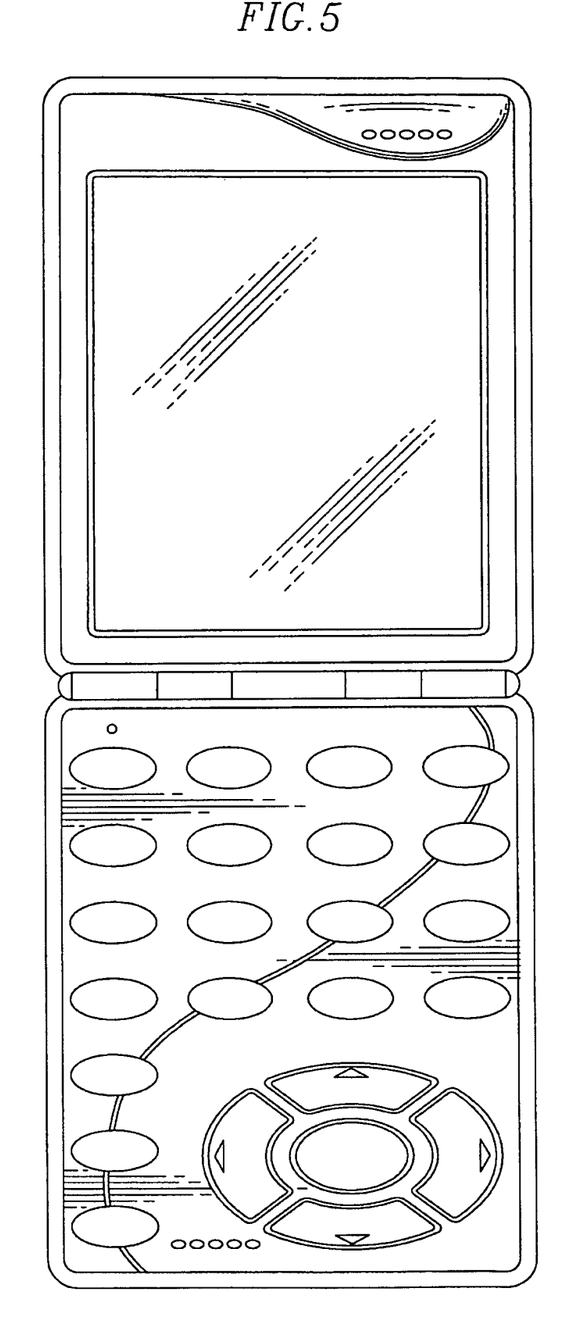
FIG. 5 illustrates a PCD.

FIG. 1A illustrates a block diagram of a system in accordance with aspects of the present invention. An Internet service provider (ISP) 11 is linked to a user personal computer 13 via telephone lines 15. In actuality, one or more computer units may be interdisposed between the PC and the server, with the server being a node on the Internet. The server is also connected via communication link to a personal computer device 17. One embodiment of the personal computer device is illustrated in FIG. 5 The personal computer device may be a PCD of the type disclosed in U.S. patent application Ser. No. 08/879,955, now U.S. Pat. No. 6,148,261, the disclosure of which is incorporated herein in its entirety by reference.

The PCD includes a global positioning system (GPS) receiver. Accordingly, the PCD receives signals from GPS satellites 19. The received signals allow the PCD to determine its latitude and longitude.

The PC, in one embodiment serves as a server. The server includes a database. The database includes information pertaining to a variety of topics. More specifically, in one embodiment the database includes information relating to locations. That is, the database includes information regarding specific locations, as well as information pertaining to transportation to and from these locations.

The information in the database is provided by businesses, individuals, and users of PCDs. Thus, the database contains general information provided by businesses, stores, and other commercial entities who wish to make information concerning their business available to others. The database also contains personalized information regarding points of interest and other matters provided by users of PCDs. The database therefore provides a source of information to the users of PCDs, particularly information regarding geographic locations.

FIG. 1 illustrates a further system of the present invention. A personal communication device (PCD) 11 provides GPS receiver and wireless communication capability, particularly cellular telephone communication capability. The PCD may, in one embodiment, be such as disclosed in the aforementioned U.S. patent application Ser. No. 08/879,955, now U.S. Pat. No. 6,148,261. The PCD receives information from a wireless GPS server 13 via cellular telephone communication link. The PCD also provides the wireless GPS server information over the communication link, including information relating to the location of the PCD. In one embodiment the PCD determines its location using, for example, its GPS capability. In another embodiment the PCD contains only a limited amount of GPS receiver processing circuitry. Instead, some of the GPS processing occurs at a wireless GPS server. The wireless GPS server performs, for example, functions such as determining satellites in view of the PCD and the relative Doppler offsets of the satellites. This may be accomplished, for example, using apparatus and methods discussed in U.S. Pat. No. 5,663,734 entitled "GPS Receiver and Method for Processing GPS Signals," the disclosure of which is incorporated by reference. In one embodiment, error correction processing is also performed by the wireless GPS server, thereby further allowing reduced single processing on the part of the PCD.

Accordingly, in one embodiment the PCD provides a wireless GPS server with the present location and an identifying tag indicating the identity of the PCD. The GPS server provides the PCD location and identifier to an application server 15. The application server is provided the information from the GPS server via the Internet, or in some cases an intranet. The application server upon receipt of the PCD location and identifying tag executes a program which updates a user-specific data space 17. In one embodiment, the user-specific space is located on the same computer unit as the application server. In other embodiments, the user-specific data space is stored in a separate computer system.

In one application the application server and the wireless GPS server communicate using a hypertext transfer protocol (HTTP) and the wireless GPS server requests that application server execute a CGI script or program making use of the PCD identifier and the PCD location data.

Thereafter the user contacts the application server to obtain information stored in the user-specific storage area. In addition, other individuals may also contact the application server request of the location of the PCD device. This may be accomplished for example, in order to determine how to contact the individual using the PCD.

Figure 2:
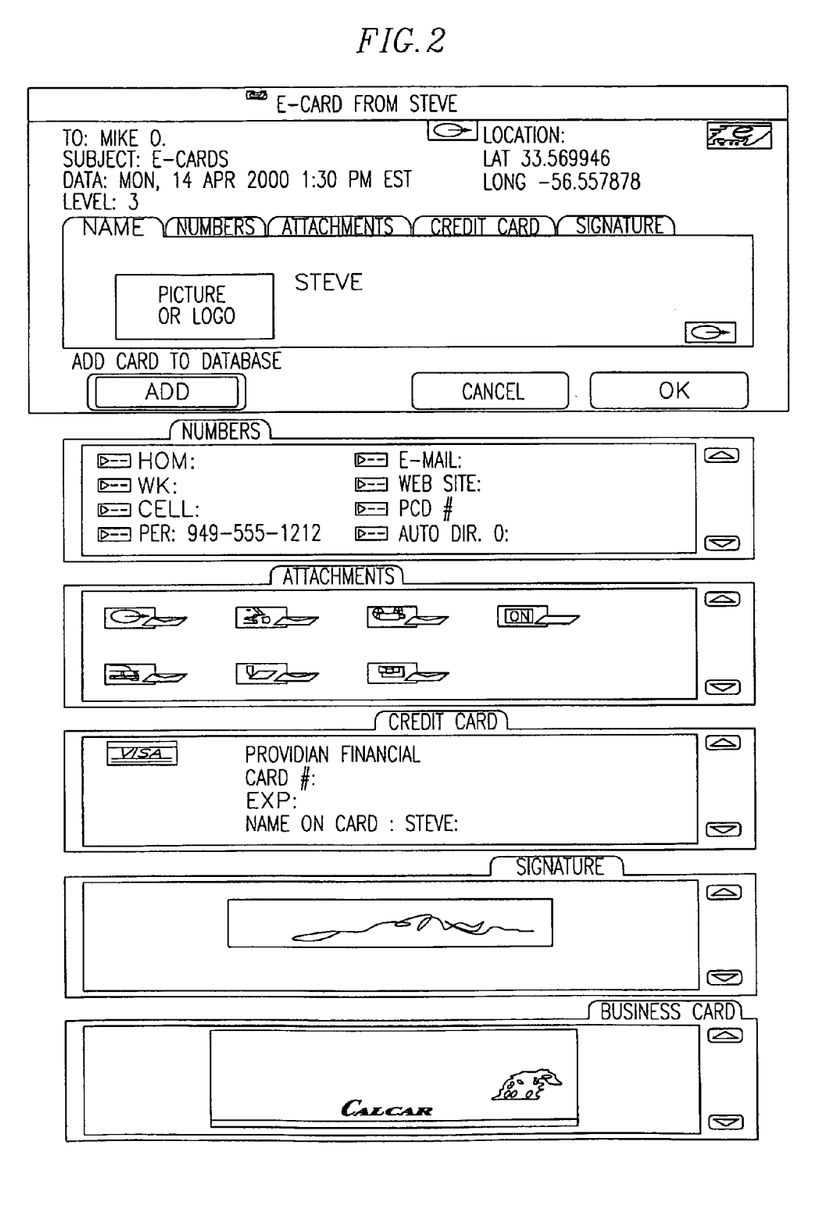
FIG. 2 illustrates an e-card in accordance with aspects of the present invention.

In one embodiment the user-specific storage space includes information found on an electronic card (e-card). An example of information stored in the e-card is illustrated in FIG. 2. As illustrated in FIG. 2, the e-card includes a name, an address such as may be found on physical business cards. The e-card also includes communication information, such as phone numbers for home, work, cell, pager, and PCD, and automobile. Further, the numbers include a web site location and an e-mail address. The card may also include attachments, which is particularly useful when a user is transmitting e-cards to another person. The e-card additionally contains credit card information. The credit card information, along with a signature also available on the e-card, allows the e-card to be used as a payment transfer mechanism. Further, the e-card includes the current location of the individual associated with the e-card.

In addition, the user-specific space is populated with information useful to the particular user. This may be done in the manner described in U.S. patent application Ser. No. 09/126,936 the disclosure of which is incorporated by reference.

In operation, in one embodiment the GPS server periodically transmits a request for, or probes, the location of a PCD. The PCD responds to the probe by providing position information to the GPS server. The GPS server provides the application server an indication of the PCD and an indication of the location of the PCD. The application server updates the user-specific space with the location of the PCD, or provides the location information to another computer system which performs the update.

The user of the PCD may also contact the application server, or other computer maintaining the PCD user-specific space, to review and modify data in the user-specific space. The user may also provide varying levels of access to data in the user-specific space, or the e-card, to both persons known and unknown to the user.

In one embodiment the GPS Server performs many of the functions of the system. Thus, in one embodiment the GPS Server performs probes of PCDs and receives preference updates from users, including contact phone numbers for the user. The GPS server sends updated user information to the application server which stores the information in the user-specific space, which in one embodiment is similar to an individual home page, which may be commonly found on the internet. The user calls a number associated with the GPS server to modify or review status or make additional requests and changes with respect to the user-specific space, and subscribers and parties requesting location and contact information on user are given information, which may vary by the requestor. The user makes the determination as to the access privileges provided requester, generally prior to their request.

The user of the user-specific space provides many benefits, including by providing a location for information concerning the individual. For example, in some embodiments the user-specific space includes tagged movie files, medical files, credit information attached to the contact card. In further embodiments the information may include smart caller ID, phone number calling ID, call forwarding techniques, Navigation information, navigation address books, navigation bookmarks, personal address books, contact manager software, schedule directors, e-mail, fax documents, voice mail are combined on the user's home page for easy access by the user/publisher. The user can arrange specific techniques for contacting him or his dynamic data from specific authorized subscribers.

The user-specific storage space therefore provides for storage and retrieval of e-cards. In addition, the space stores complete navigation information, maps, address books, persona files, navigation bookmarks, advertising bookmarks, smart contact bookmarks all GPS tagged, as well as providing Smart Contact manager, caller ID, Phone ID, call forwarding, call screening, e-mail system, Mail, Voice mail, dynamic data collection system from GPS server, advertising searching and smart bookmarking, and user schedule manager functions.

E-cards provide electronic card file of the user's personal information and attached movie files, complete attachment system from voice, data, fax e-911 medical, personal, and vehicle data system establishes contact and screening system for subscribers. A user updates the e_card, as well as other information on the space on occasion when contacted by GPS server.

Figure 3:
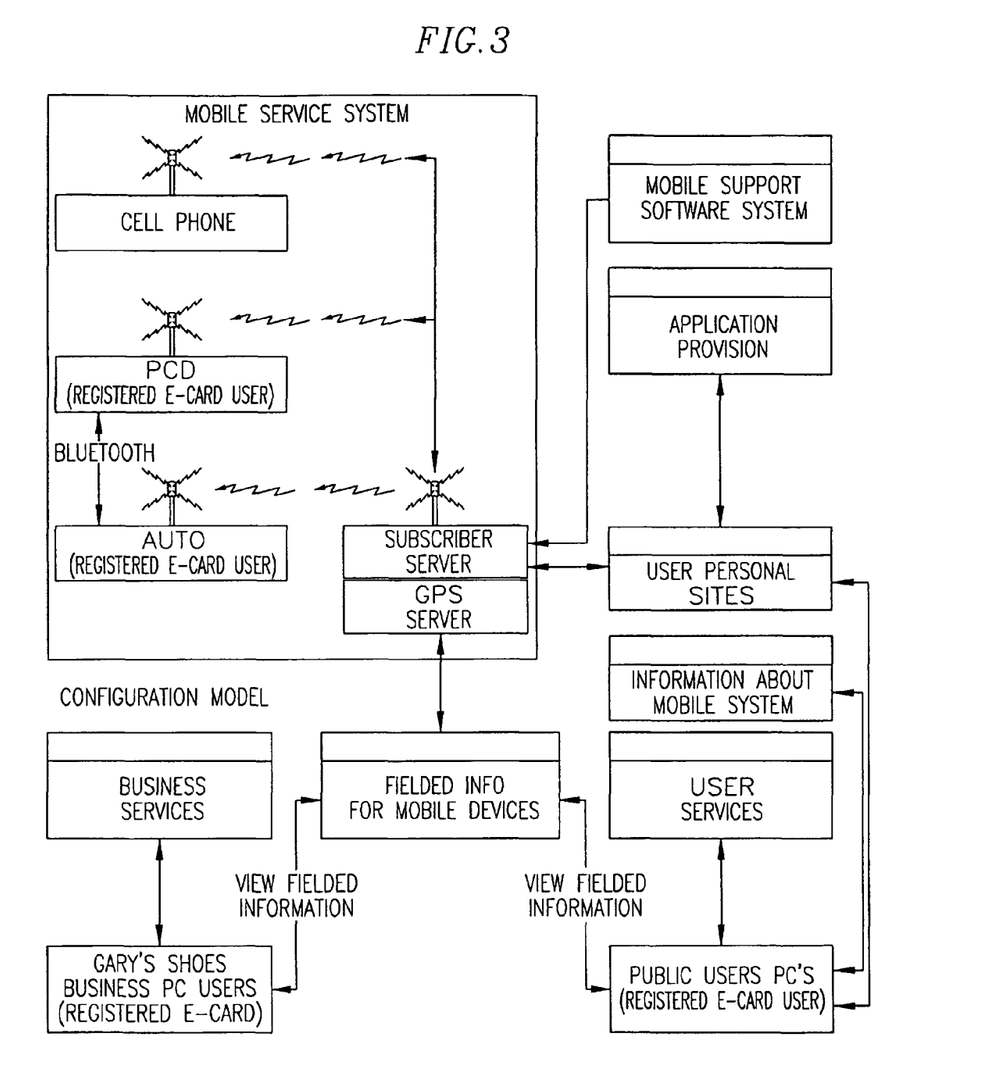
FIG. 3 illustrates a block diagram of interconnections in accordance with the present invention.

FIG. 3 illustrates a communication flow block diagram between various components of systems in accordance with the present invention. The embodiment in FIG. 3 includes a subscriber server and a GPS server. The subscriber server and GPS server are in communication with various web servers over the Internet, as well as with mobile devices. As illustrated, the mobile devices include a cell phone, a PCD, and an automobile phone. Together, the subscriber server, GPS server, and the mobile devices comprise a mobile service system. The PCD and the automobile telephone system are both coupled to user-specific storage areas which provide additional information.

The GPS server and subscriber server are also coupled to numerous web servers over the Internet. For example, the subscriber server is coupled to a mobile support software system. The mobile support software system provides application information and programs to the mobile devices by way of the subscriber server as necessary.

The subscriber server is also coupled to a web server containing numerous user-specific storage spaces. The web server is also coupled to an additional application server containing numerous applications for use in configuring user information. The web server, and the user-specific storage space is also coupled to public users over the Internet. Public users may, for example, interrogate the user-specific space to determine the user's location or other information regarding the user. As discussed in U.S. patent application Ser. No. 09/126,936, the disclosure of which is incorporated by reference, security levels may be implemented so as to restrict the number of people who can access various information about the individual. The general public, and specifically business PC users, may also desire to provide information to the users of for example, PCDs or others moving in location. Accordingly, the general public may provide information to a fielded information web server. The fielded information web server makes location-specific information available to the GPS server, and thus the mobile users. This allows the mobile users for example, to interrogate the fielded information web server to determine the location of nearby places of business in which they may have an interest. This interest may be because they intended to visit the business, are due to a sudden change in circumstance which makes the mobile user desirous of visiting the business.

Figure 4:
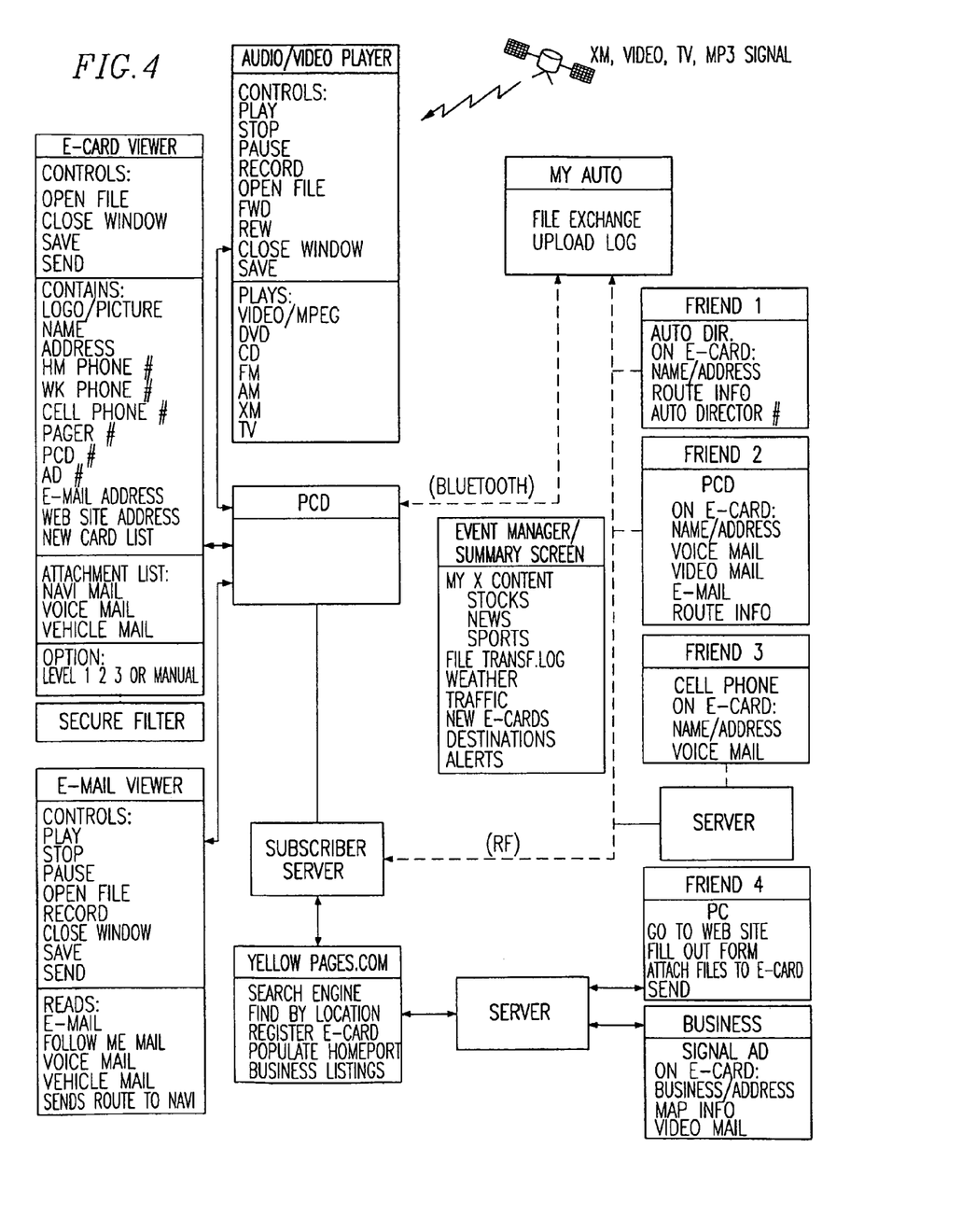
FIG. 4 is a further block diagram of interconnections in accordance with aspects of the present invention.

FIG. 4 further illustrates communication and function flow for a PCD. As illustrated, the PCD is in communication with an automobile user and the PCD is also in communication with the subscriber server. Communication with the subscriber server allows the PCD to obtain information regarding businesses, for example.

In accordance with aspects the present invention, the central computer system also maintains information in a database allowing individual users to be easily located both physically and in terms of their electronic communication locations. The central computer system maintains a database of individuals and an Internet address linked to each individual. The Internet address linked to each individual need not be a unique address, but instead many individuals may make use of a single computer indicated by the Internet address in the Internet address field. For example, for many cases the central computer system may be the computer system identified by the Internet address.

The system also contains a large number of computer systems linked by the Internet, and which are the computer systems pointed to by the address field for the individuals in the Internet address field. Each of these computers form a home site computer system. The responsibility of maintaining the home site computer systems are the responsibility of the individuals.

The home site computer system maintains electronic contact information and geographic location of the individual. The electronic contact information includes home telephone numbers, office telephone numbers, cellular telephone numbers, fax numbers, and e-mail addresses. The geographic location is provided in terms of latitude and longitude, although street addresses or site names can also be provided with the latitude and longitude.

Also linked to each electronic communication identifier in geographic location information is a security level index. In one embodiment, the security level index is a number between one and ten. The individual assigns security level indexes for each item of information. The user also identifies other individuals who may wish to contact the user, and indicates which security index level each such other individual should be provided. Other individuals who are not identified by the user are provided a default security level index. When the home site is contacted by another individual, the other individual provides an identifier, such as the individual's name to the home site. In one embodiment the other individual also provides a password to the home site so that the home site may authenticate the identity of the individual. Based on the identity of the individual, preferably authenticated, the home site determines the other individual's security level index.

The other individual is thereafter only able to obtain information for the other individual's security level index value and those values below the other individual's security level index. For example, a user's general office work number may be assigned a security level index of ten, with the user's direct line phone number provided a security level index of six. A first other individual with a security index level of seven can only obtain the user's general office number while a second other individual with a security index level of six can also obtain the user's direct line phone number.

The user's geographic location is updated through the PCD. As previously discussed, the PCD can be used to provide e-mails indicative of the user's location in varying manners. When the user's home site computer system is identified as an e-mail address for such updates, the user's home site computer system may track the user over time. In one embodiment of the invention, the user's home site computer system is always provided a copy of any e-mail position updates provided by the PCD.

The present invention therefore provides a location-centric information system. Although the invention has been described with respect to certain specific embodiments, it should be appreciated that the invention may be practiced other than as specifically described.

What is claimed is:

1. A location relevant server system comprising:
   a server receiving information indicating a location of a mobile communication device, and data related to a proximity of the location of the mobile communication device, the server being connected to a network;
   memory accessible to the server, the memory storing information relating to a user of the mobile communication device, the memory including data concerning the location of the mobile communication device, personalized data regarding points of interest to the user of the mobile communication device, and data concerning establishment of communication with the mobile communication device; and
   wherein the server executes a program allowing access to the memory storing the information relating to the user of the mobile communication device, the program allowing different people different access to the memory based on the identity of the user.

2. The system of claim 1, wherein the location of the mobile communication device comprises GPS coordinates of the mobile communication device.

3. The system of claim 1, wherein the memory includes a photograph of the user.

4. The system of claim 1 additionally comprising a database comprising information provided by the user relating to a specific location.

5. The system of claim 4, wherein the program executed by the server allows access to information relating to the location of the user and information provided by the user relating to the location.

6. A method of communication with a location relevant server system, the method comprising:
   receiving, by a server connected to a network, information indicating a location of a mobile communication device and data related to a proximity of the location of the mobile communication device;
   storing the information in memory accessible to the server, the memory storing information relating to a user of the mobile communication device, the memory including data concerning the location of the mobile communication device, personalized data regarding points of interest to the user of the mobile communication device, and data concerning establishment of communication with the mobile communication device;
   receiving by the server a request by the user to modify the personalized data;
   storing modified personalized data in the memory;
   receiving by the server a request by a different user to access the information; and
   executing a program allowing the different user access to the memory storing information relating to the user of the mobile communication device based on the identity of the different user.

7. The method of claim 6, wherein the location of the mobile communication device comprises GPS coordinates of the mobile communication device.

8. method of claim 6, wherein executing the program comprises providing the different user the specific location of the user and information provided by the user related to the specific location.

9. A location relevant server system comprising:
   a server receiving information indicating a location of a mobile communication device, the server being connected to a network;
   memory accessible to the server, a user-specific portion of the memory storing information relating to a user of the mobile communication device, the user-specific portion of the memory including data concerning the location of the mobile communication device, personalized data regarding points of interest to the user of the mobile device, the personalized data being populated by the user and being modifiable by the user, and data concerning establishment of communication with the mobile communication device; and
   wherein the server executes a program publishing information stored in the user-specific portion of the memory to different people based on a user-defined access list. the user-defined access list being modifiable by the user and identifying different people that may or may not have access to the user-specific portion of the memory.

10. The method of claim 9, wherein the location of the mobile communication device comprises GPS coordinates of the mobile communication device.

11. The system of claim 9, wherein the user-specific portion of the memory includes a photograph of the user.

12. The system of claim 11, wherein the program publishes the user's location and a photograph of the user to people on the user-defined access list.

13. The system of claim 12, wherein the user sends a visited location to the user-specific portion of the memory.

14. The system of claim 13 additionally comprising a GPS server configured to determine the visited location.

15. The system of claim 9, wherein the user-specific memory includes a movie file.

16. The system of claim 9, wherein the user-specific memory includes a tagged movie file.

17. The system of claim 9, wherein the user-specific memory comprises an individual home page populated by the user.

18. The system of claim 9, comprising a mobile service system comprising a plurality of subscribers and a plurality of subscriber-specific portions of the memory, each susbscriber-specific portion of the memory comprising data concerning the associated subscriber's location and other data concerning the subscriber.

19. The system of claim 18, wherein the system is configured so that the subscriber can set a plurality of security levels to limit which data concerning the subscriber is available to be accessed by which requestors.

20. The system of claim 19, wherein the requestors are other subscribers.

21. The system of claim 19, wherein the subscriber can identify other parties as friends.

22. The system of claim 18, wherein the system comprises a database comprising information provided by subscribers relating to specific locations.

* * * * *

UNITED STATES PATENT AND TRADEMARK OFFICE
CERTIFICATE OF CORRECTION

PATENT NO. : 8,892,117 B2
APPLICATION NO. : 12/075403
DATED : November 18, 2014
INVENTOR(S) : Michael L. Obradovich Page 1 of 1

It is certified that error appears in the above-identified patent and that said Letters Patent is hereby corrected as shown below:

In the Claims

In column 8, line 4, claim 8, before "method" insert --The--, therefor.

In column 8, line 24, claim 9, delete "list." insert --list,--, therefor.

Signed and Sealed this
Twenty-ninth Day of September, 2015

Michelle K. Lee
*Director of the United States Patent and Trademark Office*